United States Patent [19]

Acampora

[11] Patent Number: 4,553,158

[45] Date of Patent: Nov. 12, 1985

[54] CIRCUITRY FOR CORRECTING MOTION INDUCED ERRORS IN FRAME COMB FILTERED VIDEO SIGNALS

[75] Inventor: Alfonse Acampora, Staten Island, N.Y.

[73] Assignee: RCA Corporation, Princeton, N.J.

[21] Appl. No.: 577,505

[22] Filed: Feb. 6, 1984

[51] Int. Cl.[4] .................. H04N 9/535; H04N 5/21
[52] U.S. Cl. ................................. 358/31; 358/36
[58] Field of Search .................. 358/31, 36, 37, 166, 358/167

[56] References Cited

U.S. PATENT DOCUMENTS

| 4,232,330 | 11/1980 | Heitmann | 358/31 |
| 4,296,436 | 10/1981 | Achiha | 358/167 |
| 4,343,019 | 8/1982 | Lagoni | 358/36 X |
| 4,498,099 | 2/1985 | Pritchard | 358/31 |
| 4,498,100 | 2/1985 | Bunting et al. | 358/31 |

FOREIGN PATENT DOCUMENTS

| 3007520 | 9/1981 | Fed. Rep. of Germany . | |
| 0123280 | 9/1980 | Japan | 358/31 |
| 2035745 | 6/1980 | United Kingdom | 358/31 |
| 2114848 | 8/1983 | United Kingdom | 358/31 |

OTHER PUBLICATIONS

Pritchard, "ACCD Comb Filter for Color TV Receiver Picture Enhancement", RCA Review, vol. 41, Mar. 1980, pp. 3-28.

"A Motion-Adaptive System for Converting Color TV Signals into High Definition Signals", ITEJ, 7-2-80.

Primary Examiner—John C. Martin
Assistant Examiner—Michael P. Dunnam
Attorney, Agent, or Firm—Eugene M. Whitacre; Paul J. Rasmussen; Eric P. Herrmann

[57] ABSTRACT

A frame-to-frame comb filter system which reduces motion induced artifacts in the comb filtered luminance signal includes line comb filter circuitry for extracting luminance cross components from the comb filtered chrominance signal and reinserting them into the comb filtered luminance signal and a line comb filter in the luminance path following reinsertion of the luminance cross components to reject motion induced chrominance cross components occurring in the comb filtered luminance signal. The latter line comb filter is switched into the system during periods of interframe image motion.

9 Claims, 5 Drawing Figures

CIRCUITRY FOR CORRECTING MOTION INDUCED ERRORS IN FRAME COMB FILTERED VIDEO SIGNALS

BACKGROUND OF THE INVENTION

This invention relates to frame-to-frame comb filters for separating the luminance (Y) and chrominance (C) components of composite television signals and more particularly to means for correcting signal distortion due to the occurrence of motion between successive video frames in such a comb filter system.

Electronic signals which are periodic in nature may be processed advantageously by storing replicas of the signal which are separated in time by the repetition period and then combining the stored replicas to enhance information content of the signal. For example, conventional NTSC television broadcast systems (and most video record/playback systems) are arranged so that much of the brightness (luminance) information contained in an image is represented by signal frequencies which are concentrated about integral multiples of the horizontal line scanning frequency. Color (chrominance) information is encoded or inserted in a portion of the luminance signal spectrum around frequencies which lie halfway between the multiples of line scanning frequency (i.e., at odd multiples of one-half the line scanning frequency).

Chrominance and luminance information can be separated and detail information may be enhanced by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other (so-called interlaced frequency components). Luminance signal components for corresponding image areas on successive lines are substantially in phase with each other (and comprise non-interlaced components).

In a comb filter system, one or more replicas of the composite image-representative signal are produced which are time delayed from each other by at least one line scanning interval such that the phase of delayed and non-delayed chrominance component are 180° out of phase. The delayed signals are added to non-delayed signals, resulting in the cancellation of the interlaced frequency components (e.g., chrominance) while reinforcing the non-interlaced frequency components (e.g., luminance). By subtracting the delayed and non-delayed signals (e.g., by inverting one of the signals and then adding the two), the non-interlaced frequency components are cancelled while the interlaced frequency components are reinforced. Thus, the luminance and chrominance signals may be mutually combed and thereby may be separated advantageously.

Now consider a stationary picture and a particular pixel of that scene. It will be appreciated that the level of redundancy of the signal representing that pixel on a frame-to-frame basis will be substantially one hundred percent. Thus, if combing were performed on a frame-to-frame basis, the percentage of residual luminance signal in the combed chrominance signal will be substantially zero. Similarly the residual chrominance signal in the combed luminance signal will be substantially zero. By design, the chrominance signal of an NTSC composite signal is synchronized to have a 180 degree phase relationship from frame to frame permitting comb filtering on a frame basis. The luminance component may therefore be extracted by linear addition of the composite signal from successive frames and the chrominance component may be extracted by linear subtraction of the composite signal from successive frames. The response characteristic of a frame-to-frame comb filter has nulls or teeth spaced at 30 Hz intervals.

In the frame-to-frame combing process, non-stationary objects give rise to distortions in the reproduced images. These distortions are due to signal changes from a given pixel from frame to frame and result in incomplete cancellation of the luminance and chrominance components in the combed chrominance and combed luminance signals respectively as well as an effective bandwidth reduction of the luminance signal in the regions of motion. Residual signals resulting from incomplete cancellation are designated herein as cross components.

Differences in scene content due to object motion or camera panning, that occur in the time frame of one-thirtieth of a second or faster are characterized as being visual motion of the scene content. The motion induced distortions created by the frame-to-frame combing process are two dimensional. The distortions are observable in both the horizontal and vertical directions in the plane of the image and are manifested as dual images in the reproduced scenes. The dual images are separated by an amount corresponding to the rate of motion and may be accompanied by incorrect hue at the edges of the moving objects. In addition, the outlines of the images may display color distortions.

It is an object of the present invention to reduce the objectionable effects produced by motion in a frame-to-frame combing system.

BRIEF SUMMARY OF THE INVENTION

The present invention is a video signal frame comb filter system including circuitry for correcting motion induced artifacts in the luminance signal. The system includes a frame comb filter for producing separated luminance and chrominance signal components from a composite video signal. Circuitry is coupled to the separated chrominance signal to extract luminance cross components which occur in the chrominance signal during interframe image movement. The luminance cross components are combined with the separated luminance signal from the frame comb filter to produce corrected luminance signal. The corrected luminance signal is coupled to one signal input terminal of a switch means and to the input terminal of an interline luminance comb filter. The output terminal of the interline luminance comb filter is coupled to a second signal input terminal of the switch means. The switch means couples the corrected luminance signal to a luminance output terminal in the absence of interframe image movement and couples line comb filtered corrected luminance signal from the interline comb filter to the luminance output terminal during interframe image movement. The interline comb filter removes motion induced chrominance cross components occurring in the separated luminance signal during interframe image movement. In the absence of motion the interline comb filter is removed from the luminance signal path to preclude loss of vertical image detail.

DETAILED DESCRIPTION OF THE INVENTION

Figure 1:
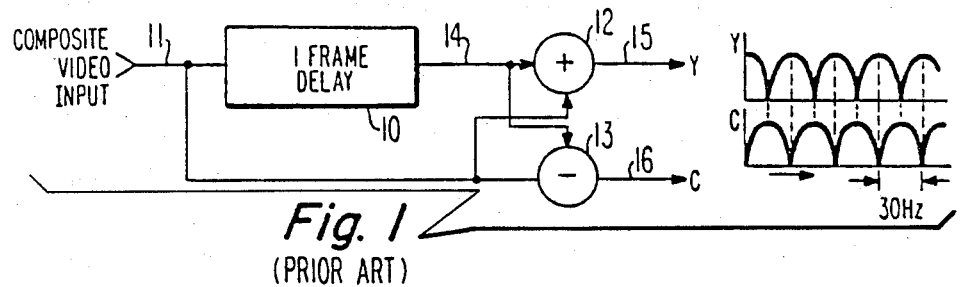
FIG. 1 is a block diagram of a frame-to-frame comb filter known in the art of TV signal processing.

FIG. 1 illustrates the basic frame-to-frame comb filter. For purposes of illustration, the apparatus will be described in terms of separating luminance and chrominance signals from a composite TV signal, however, the apparatus is not limited to this particular application. For example, the apparatus of FIG. 1 may be used to comb filter luminance signal for chrominance signal therein in the formation of a composite video signal.

In FIG. 1, a storage element 10 having the capacity to store the electrical manifestation of one frame (e.g., two fields of NTSC video format) of video signal, sequentially accepts signal from connection 11 and outputs the same signal onto connection 14 delayed by the duration of one frame period. The element 10 may comprise a digital memory, e.g., a random access memory (RAM) with the appropriate support electronics or an analog memory, e.g., a serial charge transfer device (CTD) such as a CCD with its necessary supporting circuitry. Conceptually it does not matter whether element 10 is a digital or analog circuit, since current technology permits video signal processing in either the digital or analog domain. For descriptive purposes, the memory will be assumed to be digital in nature. The remaining circuit elements incorporated therewith will also be considered to be of digital design to obviate digital-to-analog signal conversion between the circuit elements.

Input signal from connection 11 and delayed signal from connection 14 are summed together in the ADDER circuit 12. The luminance components of signal being in phase add while the chrominance components being 180 degrees out of phase cancel, to produce a substantially chrominance free luminance signal Y at connection 15. Input signal and delayed signal are also applied to the SUBTRACTOR circuit 13 wherein the chrominance components of the consecutive frames sum constructively while the luminance components cancel to produce a substantially luminance free chrominance signal on connection 16 (at least when successive frame signals are records of the same stationary scene).

Figure 2:
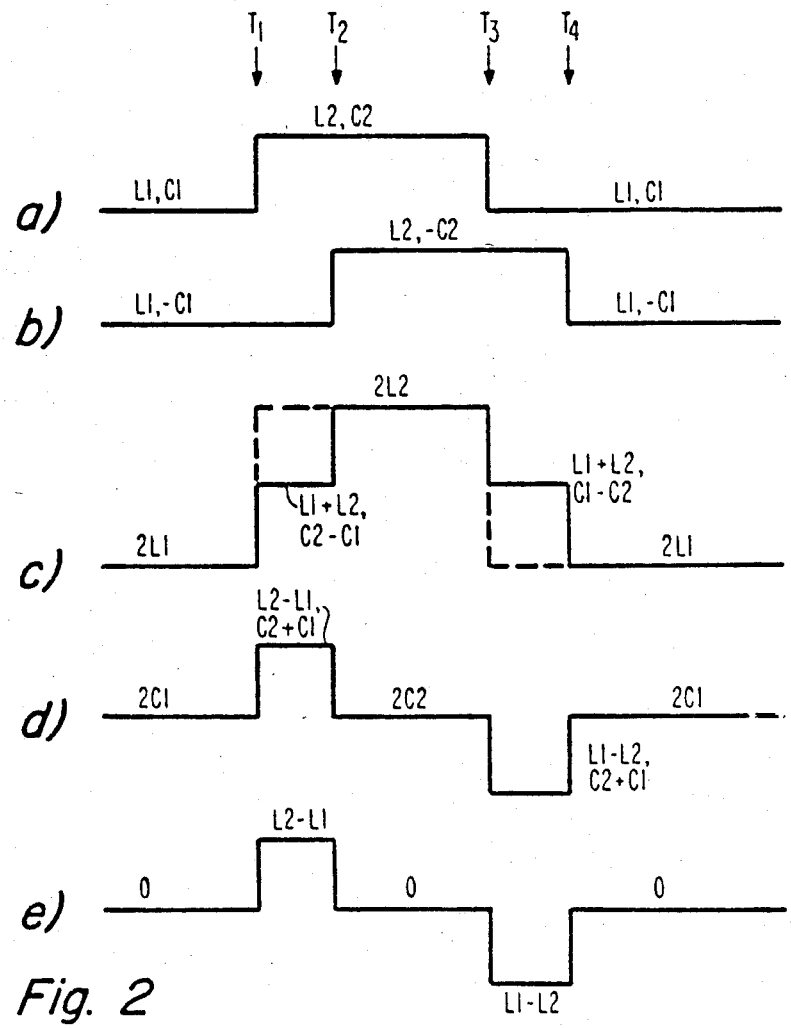
FIGS. 2a-e are amplitude versus time waveforms associated with the FIG. 1 circuit.

Referring to FIG. 2, the effects of motion on the aforedescribed frame-to-frame combing process is graphically illustrated. FIG. 2a represents a portion of the composite signal at an arbitrary time interval. FIG. 2b represents the composite video signal from the same scene exactly one frame period later in time and wherein some motion has occurred in the scene. In waveform 2a, assume that the signal component between times T1 and T3 represents an object having luminance and chrominance signal parameters L2 and C2 respectively and is located in an area of uniform scene content having luminance and chrominance signal parameters L1 and C1 respectively. Between frames, the object moves spatially causing the video signal representation of the object to translate temporally, i.e., to fall between times T2 and T4 in FIG. 2b. The relative signal parameters L and C of the luminance and chrominance components of signal remain the same between the FIG. 2a and 2b waveforms though there exists a time shift with respect to the object represented by L2, C2. The chrominance component of the signal, however, has a 180 degree phase relationship between waveforms 2a and 2b (i.e., between frames). The sum and difference of the FIG. 2a and 2b waveforms are represented by the waveforms 2c and 2d respectively. It is seen that for those segments of time in which the absolute value of the chrominance vector component between the 2a and 2b waveforms is the same, substantially complete cancellation of the chrominance component results from summing the two waveforms (FIG. 2c). Similarly, where the amplitude of the luminance component of the signal is the same between the two waveforms (2a and 2b) substantially complete cancellation of the luminance component results from a subtraction of the two waveforms (FIG. 2d). FIGS. 2a, 2b, 2c and 2d ar representative of signals occurring respectively at connections 11, 14, 15 and 16 of the FIG. 1 circuit.

Over the period where motion occurs between frames, i.e., between times T1 and T2 and times T3 and T4, unequal signals are being differentially summed, and incomplete cancellation of the undesired component occurs. In addition, the motion causes an averaging of the signal over the periods where motion occurs. These averages are represented in FIG. 2c by the signal segments denoted (L1+L2) which correspond to an amplitude of (L1+L2)/2. Normally the signal from the two frames will be weighted by a factor of ½ before being combined. The amplitude of the combed signal will be ½ the values shown and the signal during the motion period will be (L1+L2)/2. The averages (L1+L2) in the luminance signal tend to replicate the signal transitions to produce a double or phantom image which circumscribes the moving object. The averages (C1+C2) in the combed chrominance signal during periods of interframe motion tend to distort the hue around the moving object.

Low pass filtering the combed chrominance signal of FIG. 2d produces the signal shown in FIG. 2e. In FIG. 2e, the chrominance signal spectrum has been removed, leaving only the uncancelled luminance component resulting from the interframe motion. If the signal of FIG. 2e is added or subtracted to the signal of FIG. 2c, the luminance signal transitions representing the edges of the moving object will be restored, and in phase with the luminance component of the composite signal represented by FIG. 2a. Addition of the FIG. 2e signal will restore the luminance signal of FIG. 2c between the times T1 to T2 to the level of 2L2 and reduce the luminance signal between times T3 and T4 to the value of 2L1 as indicated by the broken lines. Alternatively, subtraction of the signal respresented by FIG. 2e from signal represented by FIG. 2c will produce a corrected luminance signal in phase with the luminance component of the composite signal represented by FIG. 2b.

Adding signals derived from low pass filtering the comb filtered chrominance component back into the comb filtered luminance signal does not effect complete restoration of the luminance signal, i.e. phantom images are not completely eliminated. The reason for this is that the bandwidth of the compensating signal is narrower than the luminance bandwidth due to the low pass filter. Higher frequency components of the signal needed to completely compensate or correct the luminance signal reside in the spectral band occupied by the chrominance signal. By virtue of low pass filtering the chrominance signal to obtain the compensating signal, the higher frequency compensating components are necessarily excluded at the filter output.

Two methods may be employed to account for the missing high frequency compensating signal components. In a first method, the luminance signal is low pass filtered during interframe image motion periods with a low pass filter having a similar frequency response to the low pass filter which produces the compensating signal. Low pass filtering the luminance signal has the effect of eliminating the high frequency components of the L1+L2 signal illustrated in FIG. 2c. Adding the signal derived from low pass filtering the chrominance signal into the low pass filtered luminance signal will completely compensate the luminance signal in the intervals T1–T2 and T3–T4.

The second method is to extract both the high and low frequency components of the luminance signal contaminating the combed chrominance signal and adding them back into the luminance signal. This may be achieved by subjecting the combed chrominance signal to a line-comb filter. The sum or additive output signal from the line comb contains the broadband luminance cross components present in the frame combed chrominance signal. The difference signal from the line comb filter contains the chrominance signal plus luminance cross components which occur at the nulls of the additive output transfer function. This portion of the luminance cross components contains information relating to vertical motion. The difference signal from the line comb is low pass filtered to eliminate the chrominance signal and combined with the additive signal from the line comb. The combined signal contains the required luminance frequency components to completely compensate luminance motion artifacts in the frame combed luminance signal.

Figure 3:
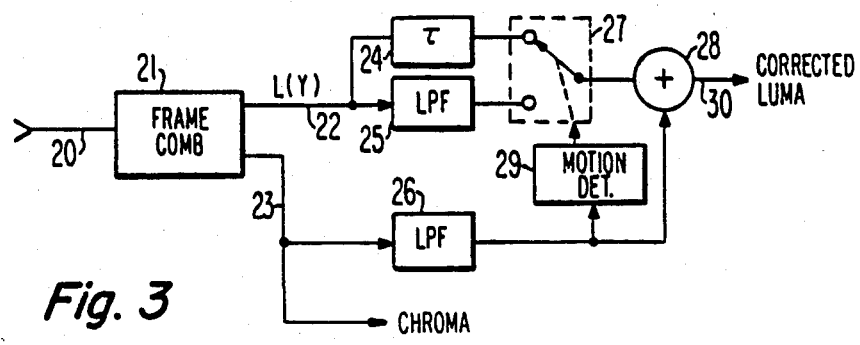
FIGS. 3-5 are block diagrams of frame-to-frame comb filter systems including circuitry for correcting motion induced artifacts in the comb filtered signals.

FIG. 3 is circuitry to perform luminance signal compensation by the first method. In FIG. 3 composite video is applied at terminal 20 to the input connection of a frame comb filter 21. Frame comb 21 may be of the type illustrated in FIG. 1 or it may contain multiple frame or multiple field delay elements as is known in the art. Frame comb 21 produces a luminance signal component, L, (or more traditionally Y) an output connection 22 and a chrominance signal component, C, on output connection 23. The signal components on output connections 22 and 23 are represented by the FIG. 2c and 2d signals respectively for moving images.

The chrominance component is applied to low pass filter 26 which attenuates or rejects the chrominance signal and outputs the low frequency luminance cross components occurring in the comb filtered chrominance signal in the presence of motion. The low pass filtered signal is applied to one input terminal of signal combining circuit 28. Note that in the absence of motion, low pass filter 26 produces no signal output. Therefore, if a threshold detector, 29, is connected at the output terminal of the low pass filter 26, the occurrence of interframe motion may be detected.

As mentioned previously, to completely compensate or correct the motion induced artifacts in the luminance signal, the frame combed luminance signal should also be low pass filtered. The frequency response of the luminance low pass filter should correspond to the frequency response of the chrominance low pass filter.

However, it is undesirable to low pass filter the luminance signal in the absence of motion since to do so will eliminate high frequency detail in the reproduced image. The loss of detail in the immediate area of moving objects is significantly less noticeable or objectionable. Thus, the circuitry is arranged to low pass filter the luminance signal only when motion is detected.

In FIG. 3, the luminance signal on connection 22 is applied to both a low pass filter 25 and a signal delay element 24. Delay element 24 delays the luminance signal by a period of time equivalent to the group delay of filters 25 and 26. Output signals from delay element 24 and low pass filter 25 are applied to respective poles of switch 27. Switch 27 responsive to signal from motion detector 29 applies delayed luminance signal from delay element 24 to a second input terminal of signal combining circuitry 28 in the absence of interframe motion. Switch 27 alternatively applies low pass filtered luminance signal from filter 25 to circuitry 28 on the occurrence of interframe motion.

Signal combining circuitry 28 linearly adds the luminance signal and the luminance cross components extracted from the combed chrominance signal to produce a motion corrected luminance signal on output terminal 30.

Two comments are in order at this point. First it may be noted from FIG. 2c that the frame combed luminance signal contains chrominance contamination (i.e. C2–C1) during motion intervals. This chrominance signal contamination is, however, removed by low pass filter 25 in the luminance signal path. Secondly, the motion detector 29 will have an inherent delay between motion signal occurring at its input terminal and a motion detection signal at its output terminal. Therefore, it may be necessary to include signal delays to account for the detector delay, e.g. in the luminance path before low pass filter 25 and delay element 24 and after the interconnection of the motion detector in the low passed filter 26 signal path.

Figure 4:
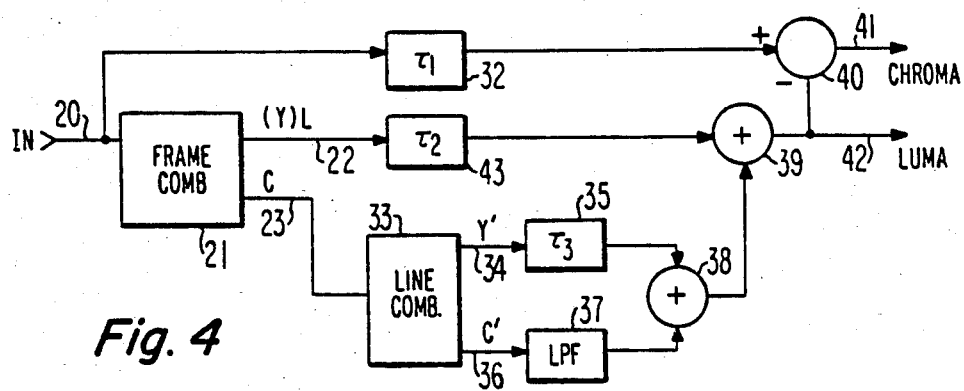

FIG. 4 shows an exemplary circuit for performing luminance motion compensation by the second aforedescribed method. In the following figures, elements designated with like numerals to those of FIG. 3 designate similar elements. As in FIG. 3, the FIG. 4 frame comb filter 21 develops on connections 22 and 23 comb filtered luminance and chrominance signals. The comb filtered luminance signal is applied to delay element 43. Delayed luminance from delay element 43 is then applied to one input of signal combining circuit 39. Delay element 43 provides a delay period, $\tau 2$, equivalent to the delays incurred by the compensating luminance signal described below.

Frame combed chrominance signal on connection 23 is applied to the input terminal of an interline comb filter 33. Interline comb filter 33 may, for example, be similar to the comb filter shown in FIG. 1 with the exception that the one frame delay element be replaced by a one line delay element.

Comb filter 33 provides an additive output signal on connection 34 which contains broadband luminance cross components Y' occurring in the frame comb filtered signal during motion intervals. The additive output response of the line comb filter has nulls at 15.734 KHz intervals. Thus, some of the luminance cross components present in the frame combed chrominance signal are absent from the line combed luminance signal Y'. The missing luminance cross components are present in the difference signal C' provided by the line comb filter 33 on its other output connection 36. Signal C' on connection 36 is applied to low pass filter 37 which attenuates the chrominance frequency band and passes the missing luminance cross component information. The luminance cross components Y' on connection 34 are delayed in element 35 by a time period equivalent to the group delay of low pass filter 37 and then combined in signal combining circuitry 38 with the luminance cross components from low pass filter 37.

The broadband compensating luminance information from circuit 38 is applied to a second input of signal combining circuit 39 to correct the luminance signal from frame comb 21 for motion induced artifacts. The corrected luminance signal is available on output connection 42.

Chrominance signal may be produced by subtracting the corrected luminance signal from uncombed composite signal. Composite signal at connection 20 is applied to delay element 32 having a delay period $\tau 1$ equal to the combined delays imposed by the circuit elements between connection 23 and connection 42. Delayed composite signal from delay element 32 is applied as a minuend to signal subtraction circuit 40. Corrected luminance signal from connection 42 is applied as subtrahend to signal subtraction circuit 40. The output signal from circuit 40 is equal to composite signal minus luminance signal or equals the chrominance component of the composite signal.

Figure 5:
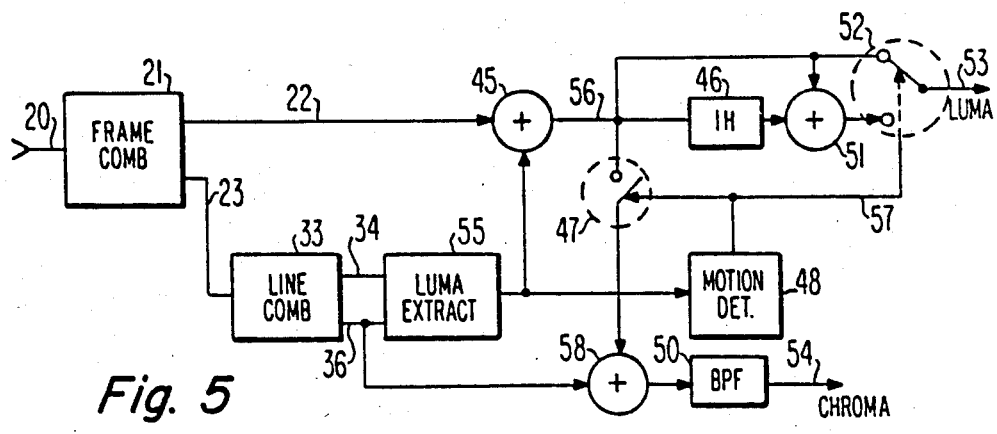

FIG. 5 illustrates further circuitry for correcting motion induced artifacts in the luminance signal. In the figure, frame comb filter 21 produces comb filtered luminance and chrominance signals at connections 22 and 23 respectively. Frame comb filtered chrominance signal is applied to an interline comb filter 33 which develops additive and difference signals on connections 34 and 36 respectively. These signals are applied to circuitry 55 which extracts broadband motion induced luminance cross components from the combed chrominance signal. Circuitry 55 may, for example, be similar to the circuitry coupled to line comb 33 in FIG. 4.

Luminance compensating signal from circuit 55 and frame combed luminance signal on connection 22 are linearly combined in signal combining circuit 45 which produces corrected luminance on connection 56. Note, however, that the frame comb filtered luminance signal contains chrominance cross components (see FIG. 2c, e.g. C2−C1). These chrominance cross components are present in the corrected luminance signal at connection 56 and will cause undesirable artifacts in the reproduced image.

The chrominance cross components are eliminated from the corrected luminance signal by passing the corrected luminance through a luminance interline comb filter. But interline comb filters inherently reduce vertical detail in reproduced images. Therefore, it is not desirable to pass the corrected luminance signal through such a comb filter when there is no interframe motion. Thus, the interline luminance comb filter is switched into the luminance signal path when interframe motion is detected and is bypassed in the absence of motion.

Referring back to FIG. 5, delay element 46 and signal combining circuit 51 form an interline comb filter. Delay element 46 may be a one horizontal line delay element (1H) or an integral number of 1H delay elements. Luminance signal from combining circuitry 45 is applied to the input terminal of delay element 46 and to one input terminal of signal combining circuitry 51.

Delayed signal from element 46 is linearly combined with non-delayed signal in combining circuitry 51. The cross components occurring in the corrected luminance signal are substantially antiphase from line-to-line and, therefore, cancel when combined. The luminance signal is subsantially similar line-to-line and thus combines constructively.

Line combed luminance signal from combining circuitry 51 is applied to a first terminal of the switch 52, which may be a transistorized transmission gate. Luminance signal from combining circuit 45 is applied to a second terminal of switch 52. Switch 52 responsive to motion detector 48 applies luminance signal from combining circuit 45 to the luminance output connection 53 in the absence of interframe motion and applies line combed luminance from combining circuit 51 during interframe motion intervals.

Motion detector 48 may be a threshold detector which provides a bilevel signal at its output connection 57. The input terminal of motion detector 48 is coupled to circuit 55 and is responsive to the luminance compensating signal provided thereby. For the luminance compensating signal being greater or lesser than a predetermined value, the bilevel signal assumes a first or second state respectively.

FIG. 2d indicates that during motion periods, the frame combed chrominance signal contains chrominance transitional components.

The averaged or transitional chrominance signal (C1+C2) occurring during these motion periods, may produce particularly objectionable color distortions. Remembering that the chrominance signal is a vector quantity, the vector sum C2+C1 during motion periods may produce colors completely different from those represented by either of the signals C1 or C2. Thus, to retain color purity at the edges of moving objects, the chrominance component must be corrected for motion induced errors generated in the comb filtering process.

The information necessary for correcting the combed chrominance signal resides in the combed luminance signal and may be reinserted by combining the corrected luminance signal from element 45 with the chrominance signal from output connection 36 of line comb filter 33. Alternatively, corrected luminance may be additively combined with framed comb filtered chrominance at connection 23, however, the chrominance signal at connection 36 has fewer cross components to be eliminated by successive filtering. The chrominance restoration should only be performed during motion sequences. The reason for this is that the entire luminance signal accompanies the chrominance compensating signal. Continuous addition of the corrected luminance signal including the desired cross components to the combed chrominance signal would effectively defeat the combing process. However, the addition of the luminance signal to the combed chrominance signal during periods of motion produces a preferable signal to no chrominance reinsertion. Since it is normally necessary to bandpass filter the combed chrominance signal to eliminate the residual luminance signal i.e., luminance motion detail, the combed luminance component added to the combed chrominance is substantially eliminated from the corrected chrominance signal. Only the luminance components residing in the spectral band of the chrominance signal remain in the corrected chrominance signal and the energy of the luminance signal in this band is relatively low.

In FIG. 5, the motion induced transitional chrominance signals (C1+C2) are corrected in signal combining circuit 58. Circuit 58 linearly adds luminance signal from connection 56 to the comb filtered chrominance signal from connection 36. The chrominance signal from circuit 58 is then applied to bandpass filter 50 which removes the luminance signal occupying frequency bands outside the chrominance signal frequency range and outputs corrected chrominance signal on connection 54.

Luminance signal from connection 56 is coupled to signal combining circuit 58 only during interframe motion intervals by the series switch 47 which is controlled by the motion detector 48.

What is claimed is:

1. Apparatus for correcting interframe motion induced signal distortion in comb filtered luminance signal derived from a frame-to-frame comb filter, which filter provides comb filtered luminance signal and comb filtered chrominance signal, comprising:
    means responsive to said comb filtered chrominance signal for extracting wide band interframe image motion induced luminance cross components therefrom;
    signal combining means responsive to the comb filtered luminance signal and said extracted wide band luminance cross components for inserting said cross components into the comb filtered luminance signal to produce corrected luminance signal;
    a luminance output terminal;
    an interline luminance comb filter responsive to said corrected luminance signal for removing interframe image motion induced chrominance cross components therefrom; and
    means for coupling said interline luminance comb filter to said luminance output terminal.

2. The apparatus set forth in claim 1 wherein the means for coupling the interline comb filter to said luminance output terminal includes:
    means responsive to the comb filtered chrominance signal for detecting the occurrence of interframe image motion and generating a control signal in response to said motion;
    means responsive to said control signal for selectively coupling the interline luminance comb filter to the luminance output terminal during periods of interframe image motion and for coupling said corrected luminance signal to the luminance output terminal in the absence of interframe image motion.

3. The apparatus set forth in claim 2 wherein the means for selectively coupling is a switch.

4. The apparatus set forth in claim 3 wherein the means for extracting luminance cross components from the comb filtered chrominance signal includes an interline comb filter.

5. The apparatus set forth in claim 4 wherein the interline comb filter included in the luminance cross component extracting means includes an output terminal at which interline comb filtered chrominance signal is available, and further includes:
    second signal combining means having a first input responsive to said interline comb filtered chrominance signal, having a second input terminal and having an output terminal;
    means responsive to said control signal for coupling said corrected luminance signal to the second input terminal of said second signal combining means during periods of interframe image motion; and
    a bandpass filter coupled to the output terminal of said second signal combining means for producing corrected chrominance signal, said bandpass filter having a passband over the frequency range occupied by chrominance signal.

6. The apparatus set forth in claim 1 wherein the means for extracting luminance cross components from the comb filtered chrominance signal includes an interline comb filter.

7. The apparatus set forth in claim 1 wherein the interline luminance comb filter comprises:
    a delay element having an input terminal coupled to said corrected luminance signal and having an output terminal, said delay element delaying signal applied thereto by a period of one horizontal video line;
    signal combining means having first and second input terminals respectively coupled to the input and output terminals of said delay element and having an output terminal at which interline comb filtered signal is available, said combining means arranged to additively combine signals applied to its first and second input terminals.

8. A video frame comb filter system for separating chrominance and luminance signals from a composite video signal comprising:
    a source of composite video signal;
    a frame comb filter having an input terminal coupled to said source and having first and second output terminals at which comb filtered luminance and chrominance signals are available;
    means coupled to the second output terminal of said frame comb filter for extracting interframe scene motion induced luminance cross components therefrom;
    means coupled to the first output terminal of said frame comb filter and responsive to said extracted luminance cross components for inserting said luminance cross components into said comb filtered luminance signal to produce corrected luminance signal;
    an interline luminance comb filter responsive to said corrected luminance signal and producing at an output terminal thereof corrected luminance signal free of interframe image motion induced chrominance cross components.

9. The comb filter system set forth in claim 8 further comprising:
    a luminance signal output terminal;
    means responsive to the comb filtered chrominance signal from said frame comb filter for detecting interframe image motion and generating a control signal responsive to such motion;
    switch means responsive to said control signal for coupling the output terminal of said interline luminance comb filter to said luminance output terminal during periods of interframe image motion and for coupling corrected luminance signal from said means for inserting luminance cross components to said luminance output terminal in the absence of interframe image motion.

* * * * *